May 24, 1949.                N. H. RICHARDS                2,471,239
                              RAKE CLEANER
                           Filed April 1, 1947
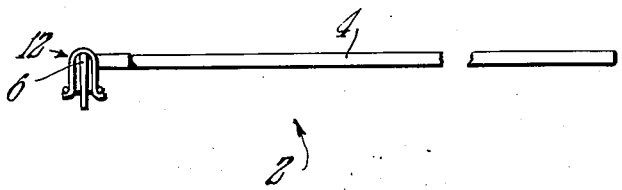
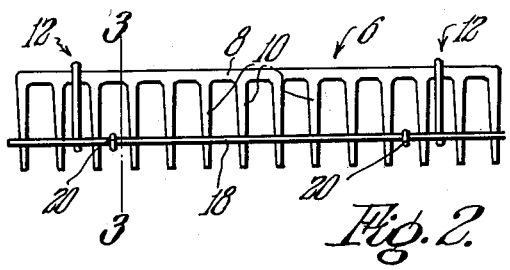
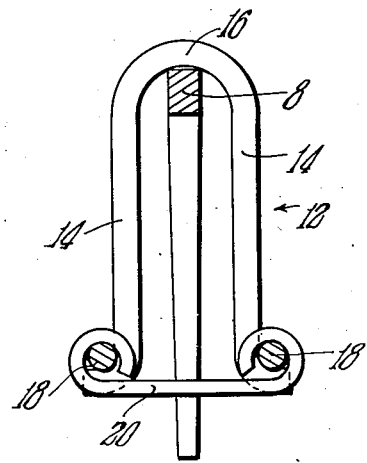
Inventor
Norman H. Richards.
By Walter C. Ross.
                                         Attorney Patented May 24, 1949

2,471,239

UNITED STATES PATENT OFFICE 2,471,239

RAKE CLEANER

Norman H. Richards, West Springfield, Mass.

Application April 1, 1947, Serial No. 738,572

1 Claim. (Cl. 56—400.08)

This invention relates to improvements in rakes and is directed more particularly to a rake having automatically operable means for cleaning the teeth thereof.

The principal object of the invention is the provision of a device for association with a rake which is adapted while the rake is being used to clean automatically the spaces between the teeth.

When raking leaves and other material, the material impinged by the teeth of the rake often clogs between the teeth so that it is necessary to manually remove the same for the more efficient operation of the rake.

According to this invention, means is provided which is associated with the head of the rake and is so constructed and arranged as to automatically clean the rake head in an efficient manner by a novel device.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a small scale side elevational view of a rake embodying the novel features of my invention;

Fig. 2 is a front elevational view at a larger scale of the head end of the rake shown in Fig. 1; and Fig. 3 is an enlarged elevational sectional view on the line 3—3 of Fig. 2.

Referring now to the drawings more in detail, the invention will be fully described.

A rake is represented generally by 2 in Fig. 1 and has a handle 4 and a head 6. The head 6, as shown in Fig. 2, includes an upper longitudinal bar portion 8 having a plurality of spaced teeth or tines 10 depending therefrom. The cleaning device includes U-shaped hangers or loops 12 which have side arms 14 and upper connecting transverse portions 16.

Longitudinal rods 18 at either side of the rake teeth are secured in some suitable manner to the lower ends of the arms 14 so that the loops and rods are integral. The rods and loops may be secured together by welding, brazing or in any other manner to provide a unitary structure. The transverse portions 16 of the members 12 are adapted to rest on the longitudinal portion 8 of the rake head as shown in section in Fig. 3.

As a rake is used for raking various materials and as said materials become clogged between the teeth or the teeth impinge the material, the efficiency of the rake is impaired in the ordinary case. In the use of the device of this invention, material which becomes clogged between the teeth or which the teeth impinge tends to elevate the device but the device being of considerable weight or in fact of any weight desired, the device bears on the material and forces it downwardly away from the teeth and the spaces therebetween. That is, as the rake is manipulated, the cleaning device, being movable on the rake head particularly for up and down movements, acts on material on and between the teeth to force it downwardly and keeps the teeth clean without effort on the part of the user of the rake.

Retainers 20 extend between certain of the teeth and below the part 8 of the rake and are secured in any convenient manner to the rods 18 so as to limit upward movements of the device relative to the portion 8 of the rake head. As the rake is being used and material becomes clogged in the spaces and lodged on the teeth, the device which is movable relative to the rake head strikes upon the material to force it from the head.

The device, as will be observed, is preferably more or less loosely associated with the head for up and down movements yet it is not accidentally removable therefrom except by disconnecting the retainers 20 which may be made to facilitate removal when desired.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

The combination of a rake head having a longitudinal bar and spaced teeth depending therefrom with a cleaning device comprising in combination, a plurality of U-shaped hangers having upper transverse portions for resting on the longitudinal bar of the rakehead and side arms depending downwardly from opposite ends of the transverse portions in spaced relation and spaced outwardly from opposite forward and rearward sides of the teeth of the rakehead, separate and parallel longitudinal cleaning bars spaced outwardly from opposite forward and rearward sides of the teeth of the rakehead and secured to the lower free ends of the sidearms of said hangers spacing the said hangers relative to the longitudinal bar of the rakehead, and transverse retainer members extending transversely between the teeth and having opposite ends fixed to said cleaning bars, said hangers and cleaning bars being movable up and down relative to the rakehead with the transverse portions of said hangers limiting downward movements of said hangers and cleaning bars and said retainer members limiting upward and longitudinal movements of said hangers and cleaning bars.

NORMAN H. RICHARDS.

REFERENCES CITED

The following references are of record in the file of this patent:

UNITED STATES PATENTS

| Number | Name | Date |
| --- | --- | --- |
| 394,521 | Thorp | Dec. 11, 1888 |
| 667,428 | Doane | Feb. 5, 1901 |
| 2,183,278 | Kelly | Dec. 12, 1939 |